Nov. 11, 1952
W. B. PRIDY
2,617,547
PIPE LOADING DEVICE
Filed Nov. 14, 1949
3 Sheets-Sheet 1
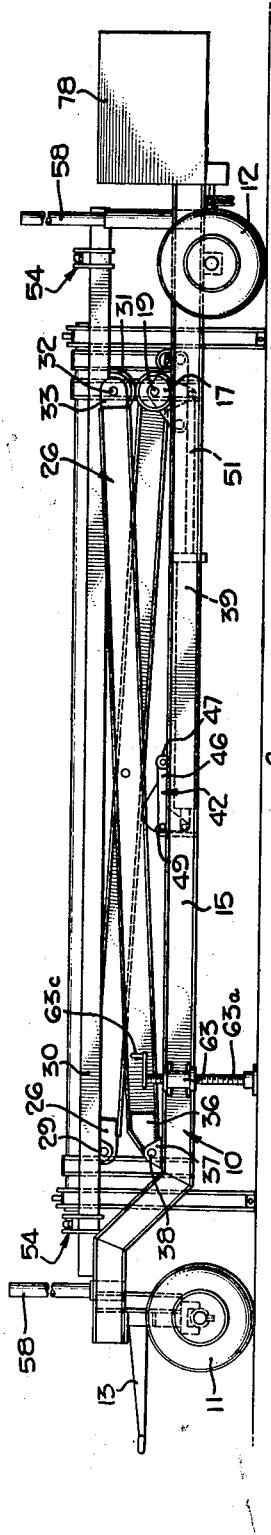
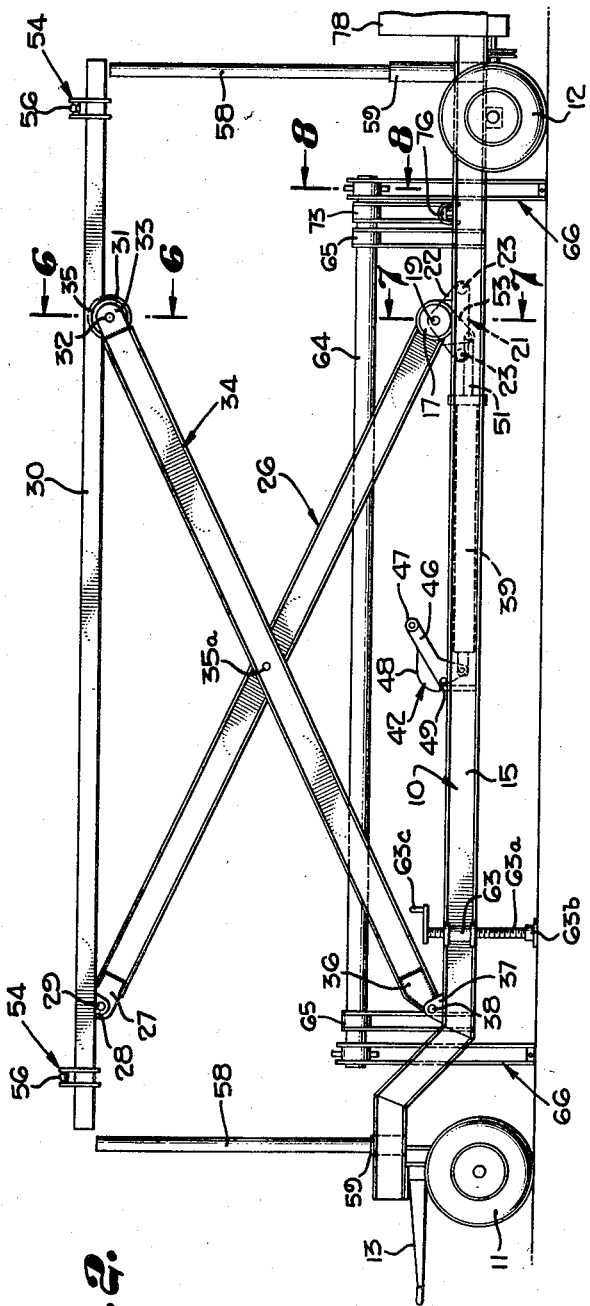
WHETSTINE B. PRIDY,
INVENTOR.
BY
ATTORNEY

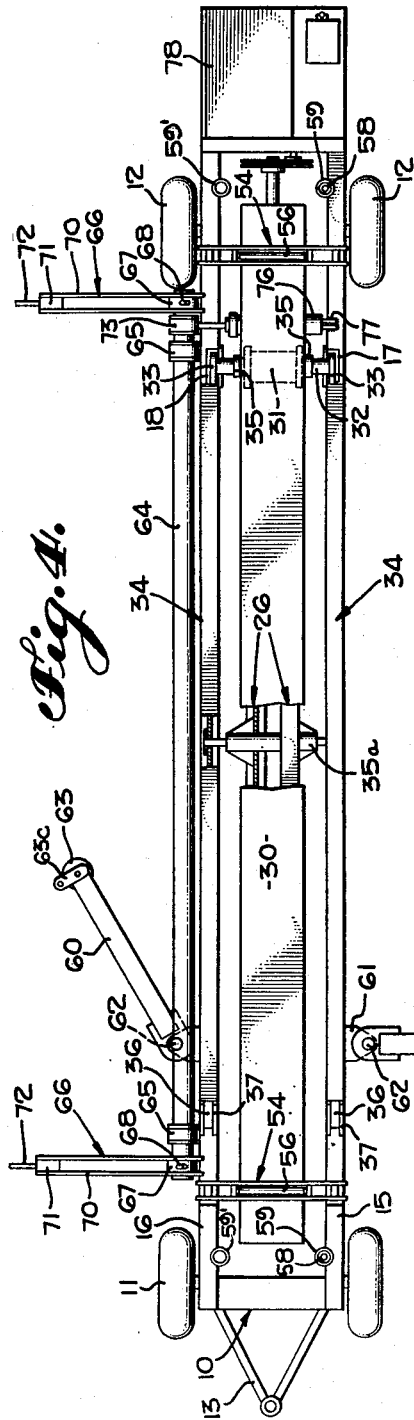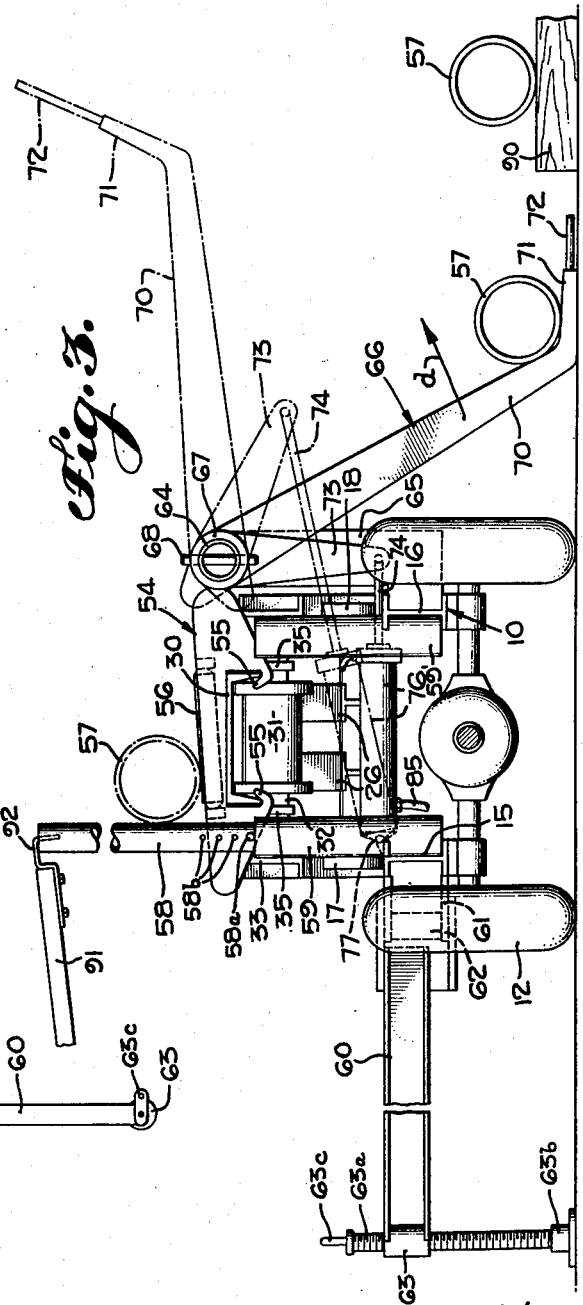

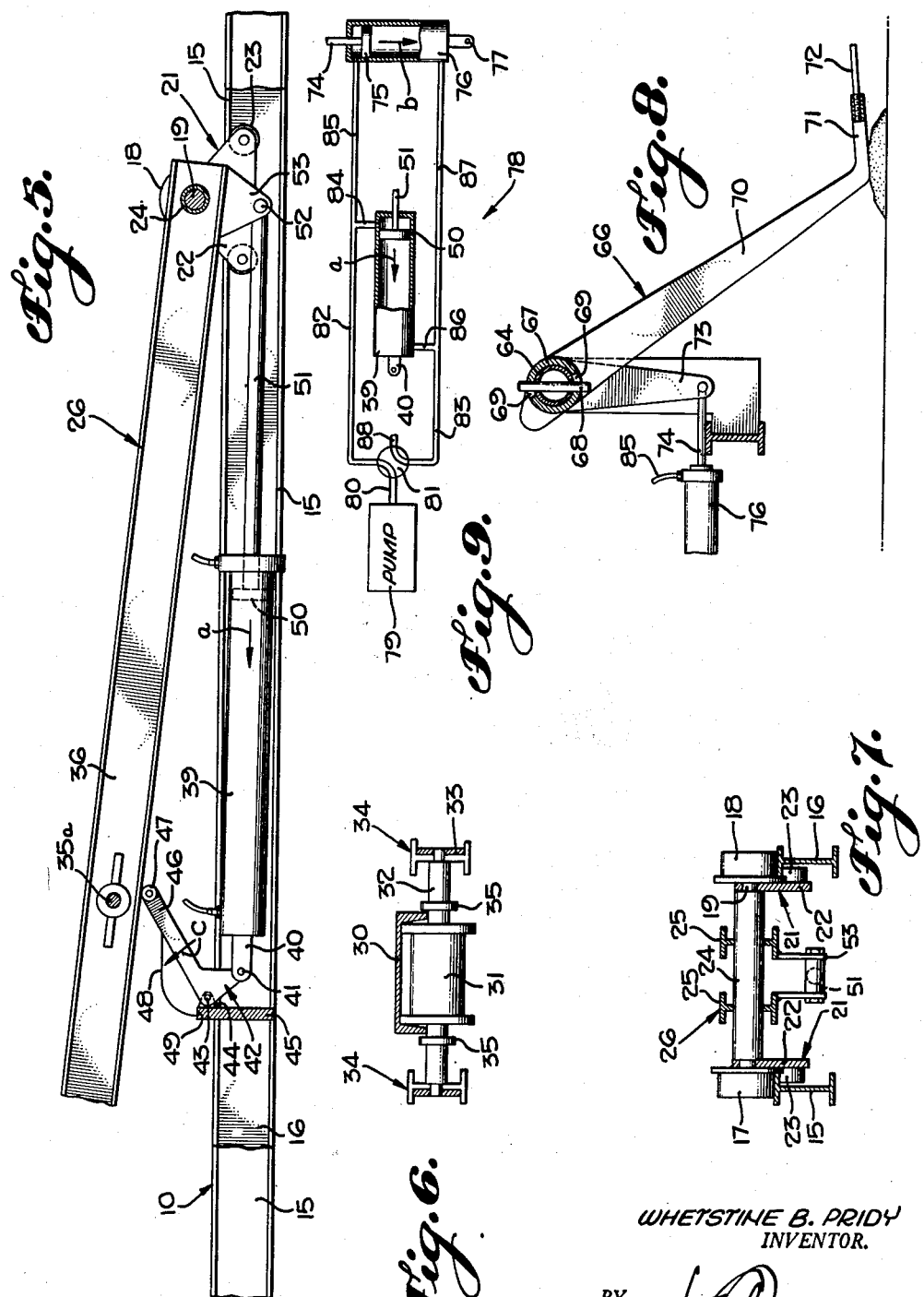

Patented Nov. 11, 1952

2,617,547

UNITED STATES PATENT OFFICE 2,617,547

PIPE LOADING DEVICE

Whetstine B. Pridy, Long Beach, Calif.

Application November 14, 1949, Serial No. 127,126

11 Claims. (Cl. 214—75)

This invention relates to oil field equipment and particularly pertains to a pipe loading device.

Much of the pipe used in oil fields comes in long sections ranging up to 45 ft. in length so that the weight of each section runs from 500 to 3,000 lbs. In the yards this pipe for the most part is stored supported on timbers resting on the ground. Transport trucks with beds constructed especially for handling this kind of pipe are employed for carrying the pipe from place to place in the industry.

Various means have been provided for transferring these heavy pipe sections from yard storage close to the ground onto such transport trucks and from the latter onto the timbers used to support the pipe in storage yards. The only satisfactory devices provided for this purpose have been of a character requiring their permanent installation at a given location. This has represented a handicap preventing the general use of said devices.

It is an object of the present invention to provide a mobile pipe loading device by which the operations of loading pipe onto or from a regular pipe transport truck bed may be readily performed with safety to the operator and with a minimum of physical exertion.

It is a further object of the invention to provide such a mobile pipe loading device which may be quickly moved from place to place and set up for operation at a given location with relatively little loss of time.

The invention is illustrated by way of example in the accompanying drawing in which:

Figure 1 is a view in side elevation showing the structure with which the present invention is concerned and with the pipe loading mechanism in its lowermost position.

Fig. 2 is a view similar to Fig. 1 with the pipe loading mechanism in its elevated position.

Fig. 3 is a view in end elevation showing the pipe loading mechanism with its loading platform in its lowermost position and indicating by solid and dotted lines the lower and upper positions of a pipe lifting arm.

Fig. 4 is a view in plan with parts broken away for the sake of convenience and showing the pipe loading vehicle set and ready for a loading operation.

Fig. 5 is a fragmentary view in elevation with parts broken away showing the operating structure for raising and lowering the platform.

Fig. 6 is a view in transverse section as seen on the line 6—6 of Fig. 2 and shows the structure of the loading platform and the engagement of one of the lifting elements therewith.

Fig. 7 is a view in vertical section as seen on the line 7—7 of Fig. 2 and shows the manner of engagement of one of the lifting elements of the lower frame structure.

Fig. 8 is a view in transverse section as seen on the line 8—8 of Fig. 2 and shows the connection between the lifting shaft whereby variation in the ground level may be accommodated.

Fig. 9 is a view in diagram showing the hydraulic cylinder for swinging the loading arm and the hydraulic cylinder for lifting the main platform and the controls therefor.

Referring more particularly to the drawing, 10 indicates the main frame of a trailer chassis. This carries suitable axles and front wheels 11 as well as rear wheels 12. The front axle is connected with a suitable draw-bar 13 which may be attached to a tractor not shown on the drawing. It is to be further understood that the pipe loading structure may be part of a self-propelled vehicle if desired. The main frame 10 is shown in Fig. 4 as comprising a pair of frame elements 15 and 16 which are spaced from each other. These elements act as a trackway for flanged rollers 17 and 18. The rollers 17 and 18 are mounted upon an axle 19 which supports the rollers 17 and 18 in a desired spaced relation. Mounted upon the shaft 19 is a pair of stabilizers 21 each of which includes a triangular plate 22, at the lower points of which triangular plate, rollers or pins 23 are secured. The pins 23 extend beneath the upper flanges of the frame members 15 and 16. It will be seen by reference to Fig. 7 that the frame members are preferably I-beam in shape and that the rollers 17 and 18 rest upon the upper flange of said frame members and that the members 23 bear against the under faces of said upper flanges so that the rollers will be held in place upon the trackway afforded by the frame elements and will move therealong. Mounted on the shaft 19 is a tubular sleeve 24 which passes through the ends of beams 25. These beams are parallel and form a central lifting element 26. Due to this mounting the lower end of the central lifting element 26 is free to move longitudinally along the frame elements 15 and 16 as supported by the rollers 17 and 18. The upper ends of the lifting members are provided with castings 27 which are attached to brackets 28 by a pin 29. The brackets 28 are secured to the main platform 30. The main platform 30 is at all times parallel to the frame structure 10 and is shown in Fig. 3 of the drawing as being channel-shaped. Disposed beneath the main platform 30, adjacent the opposite end from the bracket 28, is a roller 31 which may move back and forth between the flanges of the platform 30. This roller is mounted upon a shaft 32 carried by fittings 33. The fittings 33 are secured to the structural member 34 which constitutes the outside lifting element. The shaft 32 is formed with flanges 35 between which the flanges of the channel 30 extend and thus by which the roller 31 is stabilized to limit its longitudinal motion. This structure is particularly shown in Fig. 6 of the drawing. The outside structural members 34 are spaced from each other and lie against opposite outer faces of the channels 25 which constitute the inside lifting element 26. Midway the length of the outside lifting element 34 and the inside element 26 is a fixed pivot 35 which will permit the lifting elements 26 and 34 to have relative pivotal movement in parallel vertical plane.

The lower ends of the structural members forming the element 34 are provided with fittings 36 by which the elements are pivotal to brackets 37 by pins 38. The brackets 37 are fixed to frame members 15 of the main frame structure 10. It will be evident therefore that if the lower end of the central lifting element 26 is pulled in the direction of the brackets 38 there will be a tendency for the upper end of the central lifting element 26 and the outer lifting element 34 to rise simultaneously and lift the platform 30.

Means for moving the lower end of the central lifting element 34 comprises a hydraulic cylinder 39 particularly shown in Fig. 5 of the drawing. This cylinder is disposed between the members 15 of the frame 10 and is provided with an extension 40 which is pivoted by a pin 41 to a bell crank 42. The bell crank 42 is pivoted upon a pin 43 to a bracket 44 carried by cross beam 45 of the frame structure. The opposite end of the bell crank is provided with a relatively long arm 46 carrying a roller 47 which rests beneath the central lifting element 26 and may lift it. A cam 48 is formed on the arm 46 to insure that the central lifting element 26 starts to move easily. It will thus be seen that the hydraulic cylinder 39 is not fixed against movement but that it is free to move longitudinally as the bell crank 42 swings. A stop 49 is formed on the end of the cam 48 to abut against the cross beam 45 and limit the swinging movement of the bell crank 42 in a lifting action. Mounted in the cylinder 39 is a piston 50. This piston is attached to a piston rod 51 which extends longitudinally and is attached by a pin 52 to a lever bracket 53. The bracket 53 extends from the side of the lifting element 26 and off-center a distance from the axis of shaft 19 to insure that a suitable leverage may be imposed upon the central lifting element 26.

Mounted upon the main platform 30, which comprises a channel beam, is a plurality of pipe rests 54 which may be adjustably positioned horizontally upon the beam and which are provided with hooked fingers 55 designed to hook over edges of the flanges of the channel member forming the platform 30. These rests may be removed from the platform and fit loosely thereon so that they may be readily shifted along the platform 30 to selectively position said rests thereon, although normally said rests are preferably placed close to the opposite ends of said platform as shown in Figs. 1, 2 and 4. The upper edges of rest 54 are preferably inclined transversely of the platform 30 as shown in Fig. 3. The rests 54 preferably carry rollers 56 which extend crosswise of the platform and facilitate endwise movement of the pipe, which pipe is generally indicated at 57 by dotted lines in Fig. 3 of the drawing. To prevent a pipe 57 from rolling from the pipe rest 54 vertical tubular pipe guides 58 are telescopically mounted in tubular bearings 59 which are welded onto chassis frame beam 15 which is on the side of the chassis toward which the upper edges of the pipe rest 54 are inclined downwardly (Fig. 3). The pipe guides 58 may be set at any desired elevation in the bearings 59 as by selective insertion of a pin 58a in any desired one of a series of holes 58b (Fig. 3) depending upon the height to which it is desired to elevate a pipe 57 in a pipe stacking operation. Similar vertical bearings 59' are secured to chassis beam 16 for the reception temporarily of vertical standards (not shown) which cooperate with the standards 58 in retaining the pipe 57 on the rest 54 should it be desired to use the apparatus of this invention as a trailer for transporting from place to place one or more pipe lengths supported on the rest 54. Mounted on the channel 15 of the frame 10 is an arm 60. There may be a plurality of these arms provided on one or both sides of the frame 10. These are designed to act as outriggers and brace the frame structure so that the vehicle will not be overturned by a pipe loading operation. The details of such an arm are shown in Figs. 3 and 4 of the drawing where it will be seen that the frame is provided with a bracket 61 carrying a pivot pin 62. Mounted upon the pin 62 is the arm 60. At the outer end of each of said arms is a vertical bearing 63 which is threaded to receive a screw 63a. The screw carries a foot 63b which rests on the ground and cooperates with the screw in supporting the arm. The upper ends of each of said screws are fitted with a crank 63c or other suitable turning means so that the screw 63a may be properly adjusted for height with relation to the arm.

Extending along one side of the frame 10 and parallel to one of the frame members 15 is a tubular shaft 64 which is mounted in bearing brackets 65. The tubular shaft 64 is designed to carry pipe lifting arms 66. These arms have a bearing portion 67 through which the shaft extends. The shaft 64 is pinned to the arms 66 by pins 68 which extend through slotted openings 69 in the bearings 67 and permit a limited amount of free movement in the lifting arms 66 so that they will accommodate inequalities in the ground level as shown in Fig. 8. The lifting arms are formed with a relatively straight portion 70 which terminates in an out-turned end 71 upon which a pipe section 57 rests. The free ends of the portions 71 are formed with a threaded bore to receive an adjustable pin 72 which may slip over a pipe and along which the pipe may move as it rolls to the juncture of the main body 70 of the arm with the portion 71. This position is particularly shown in Fig. 3 of the drawing. The tubular shaft 64 is fitted with a lever arm 73 which is rigidly secured in position and is connected with a piston rod 74. The piston rod 74 is attached to a piston 75 reciprocatably mounted in a cylinder 76. The cylinder 76 is pivoted at 77 to the main frame and may swing from the position indicated in the solid lines to a position indicated by broken lines in Fig. 3. The cylinder 76 is part of a hydraulic system particularly shown in Fig. 9 and which will be hereinafter described.

Mounted at one end of the frame 10 is a power unit 78 which includes a prime mover and a suitable hydraulic pump which is driven thereby. The hydraulic pump is indicated at 79 in the diagrammatic view in Fig. 9 and is connected to a feed pipe 80. This pipe in turn is connected to a two-way valve 81 which has distributing pipes 82 and 83 attached thereto. The pipe 82 is in communication with a connection 84 which is attached to the stuffing box end of the lifting cylinder 39. As previously described the piston 50 reciprocates within this cylinder and it is to be understood that fluid delivered through the connection 84 will force the piston in the direction of the arrow $a$ as indicated in Figs. 5 and 9 of the drawing. The pipe 82 also connects to the stuffing box end of the arm swinging cylinder 76 by means of a flexible conduit 85. Fluid forced into the cylinder 76 through the conduit 85 is intended to move the piston 75 in the direction of the arrow $b$ as indicated in Fig. 9 of the drawing. The distributing pipe 83 leading from the two-way valve 81 is attached to a connection 86 which communicates with the pivoted end of the lifting cylinder 39. The pipe 83 also connects with a conduit 87 which communicates with the pivoted end of the arm swinging cylinder 76. When the valve 81 is turned to connect the pipe 80 with the pipe 82 it also connects the pipe 83 with a pipe 88 which leads to the liquid reservoir (not shown) of the pump 79. Conversely, when the valve 81 is turned to connect the pipe 80 with the pipe 83 it connects the pipe 82 with pipe 88. Thus each time fluid is delivered to corresponding ends of the cylinders 39 and 76 it is allowed to escape from the opposite ends of said cylinders to the pump reservoir through the pipe 88. Starting operations by turning the valve 81 as shown in Fig. 9, fluid is delivered under pressure from the pump 79 into the stuffing box ends of both cylinders 39 and 76 simultaneously. At the same time the opposite ends of these cylinders are connected with the return pipe 88 so that fluid pressure in said opposite ends of said cylinders drops practically to zero. If the pistons 50 and 75 were positioned as shown in Fig. 9 when the valve 81 is positioned as shown in this view, the arms 66 would be in their elevated positions as shown in broken lines in Fig. 3. The releasing of fluid pressure in the pivoted end of cylinder 76 results in the fluid being rapidly expelled from this end of the cylinder by the weight of the arms 66 imposed on the piston rod 75 and by the fluid under pressure entering from the pipe 85 into the stuffing box end of cylinder 76.

By virtue of this rapid movement of the piston 75 in the direction of the arrow $b$, a relatively high fluid pressure cannot be built up in pipes 84 and 85 until the piston 75 has been shifted to the opposite end of the cylinder 76 from where it is shown in Fig. 9. When this has occurred, a high fluid pressure immediately builds up in the stuffing box end of the cylinder 76 and in the pipes 84 and 85 with the result that fluid is then delivered under high pressure through the pipe 84 into the stuffing box end of cylinder 39 which has the effect of elevating the platform 30 to the position in which this is shown in Fig. 2, the details of operation of the lifting of this platform being explained hereinafter.

When the platform has thus been lifted, the piston 50 will be located at the opposite end of the cylinder 39 from that in which it is shown in Fig. 9 and the piston 75 will, of course, have remained at the pivoted end of the cylinder 76 during the elevation of the platform 30.

It is to be understood that the valve 81 may at any time be partially rotated to a position between its two extreme positions which will result in sealing off the pipes 80, 82, 83 and 88 from communication with each other and arrest the various parts of the apparatus in the precise positions which they are in at that moment until the valve 81 shall again be rotated to one of its two extreme positions. Assuming that the conditions above described as resulting from the setting of valve 81 as illustrated in Fig. 9 have occurred and that this valve is then rotated to its opposite extreme position in which it connects pipe 80 with pipe 83 and pipe 82 with pipe 88, the weight of the platform 30 and associated lifting structure cooperate with the fluid under pressure entering the pivoted end of cylinder 39 to rapidly shift the piston 50 to its position shown in Fig. 9 before a high fluid pressure will build up in pipes 86 and 87. The piston 75 thus remains at the pivoted end of cylinder 76 until the carriage 30 has reached its downwardmost position. As soon as this occurs, however, a high fluid pressure builds up in pipes 86 and 87 causing fluid under high pressure to be delivered to the pivot end of the cylinder 76 whereby the piston 75 is shifted in the opposite direction to arrow $b$, and towards the stuffing box end of this cylinder, thereby rotating tubular shaft 64 and swinging arms 66 mounted thereon from their lowermost (full line) position shown in Fig. 3 to their uppermost (broken line) position in this view.

Long lengths of pipe 57, such as the invention is especially adapted to handle, are ordinarily stored close to the ground resting on heavy timbers 90 as shown in Fig. 3. To locate the apparatus of the invention to hoist pipe from such a place of storage onto the bed of an ordinary pipe transport truck, the invention is positioned close to the ends of the timbers 90 by maneuvering this on its wheels 11 and 12, and the outriggers 60 are now extended as shown in Fig. 4 and adjusted to press the feet 63b firmly against the ground. The outriggers thus steady the apparatus against rocking transversely in either direction which it has an inherent tendency to do because of its very narrow wheel base. The arms 66, which are slipped off the shaft 64 after removing pins 68, whenever moving the apparatus long distances, are now replaced as shown in the drawings.

The ordinary pipe transport truck, onto which it is desired to deliver the pipe resting on the timbers 90, is then rolled up close alongside the apparatus, and suitable ramp members 91 having end hooks 92 are placed to incline upwardly from the truck body (not shown) to the upper ends of the tubular standards 58 the members 91 being supported, if desired, as by the hooks 92 extending into the upper ends of these standards.

When the valve 81 has been turned to a neutral position, from the position in which it is shown in Fig. 9, immediately upon the arms 66 having been lowered to their lowermost position and before the platform 30 has started to elevate, the platform 30 and arms 66 are both in their lowermost positions as shown in Fig. 3. A pipe 57 having been rolled from the timbers 90 onto ends 71 of the lifting arms 66, the valve 81 is turned to the reverse position from that shown in Fig. 9 which delivers fluid under high pressure along the pipes 83 and 87 to the cylinders 76 and through the pipe 86 to the cylinder 39. Pressure immediately builds up in the latter cylinder to hold the platform 30 in its down position, whereby fluid under high pressure is delivered instantly into the pivot end of the cylinder 76 causing the arms 66 to swing upwardly into their broken line position shown in Fig. 3. The pipe 57 is lifted on these arms and may now be readily rolled down these arms onto the rests 54 where it is brought to a stop by rolling against the standards 58. Immediately upon the pipe 57 thus being delivered onto the platform 30, the operator reverses the valve 81 to its position as shown in Fig. 9 which results, as above described, in the rapid lowering of the arms 66 and the upward lifting of the platform 30.

The first action of the cylinder 39 when fluid is admitted under pressure through the pipe 84 into its stuffing box end is to rock the arm 46 from the position in which this is shown in Fig. 1 to the position in which it is shown in Figs. 2 and 5. The initial portion of this rocking movement causes the cam 48 on the arm 46 to engage the lifting element 26 and swing this upwardly about the axis of the axle 19 until the roller 47 engages said element after which further rotation of the arm 46 about its pivot 43 causes the roller 47 to swing the element 26 still further upwardly about said axle as shown in Fig. 5. The action of this cam is thus to "crack" the high angle leverage by which the power of the cylinder 39 is applied to the platform elevating apparatus of the invention. When this leverage (which is manifest in Fig. 1) has thus been "cracked" as shown in Fig. 5 by starting the platform 30 upwardly, the fluid pressure in the stuffing box end of the cylinder 39 has been built up to the point where, with the somewhat lower leverage ratio now existing, it pulls the axle 19 towards the center of the apparatus thereby giving the elements 26 and 34 a scissors action which lifts the platform 30 upwardly as shown in Fig. 2 while maintaining this parallel with the ground.

The valve 81 is allowed to remain in the position shown in Fig. 9 and thus operative to cause the platform 30 to be lifted, as in Fig. 2, until the pipe rests 54 have been raised to where the pipe 57 will roll along said rests and over the tops of the standards 58 onto the ramp members 91 or any other device which may be provided to receive said pipe and conduct it onto the bed of the pipe transport truck positioned to receive the same.

The reversal of the operation above described, by which pipe is lowered from the bed of a pipe transport truck to storage on the ground level is executed in the following manner: The valve 81 is positioned as shown in Fig. 9 to raise the platform 30 to where this is just below the upper ends of the pipe guide members 58, whereupon the valve 81 is turned to neutral position to hold the platform 30 at this level. A single pipe 57 is now rolled from the truck bed over the pair of ramp members 91 and over the upper ends of the vertical guides 58 so that this pipe comes to rest on the pipe rests 54 of the platform 30. The valve 81 is now turned to the opposite position from that shown in Fig. 9 which causes the platform 30 to drop down to its lowermost position after which it causes the arms 66 to be raised to their upper position. As soon as this has taken place the pipe 57 is manually rolled from the rests 54 onto the arms 66 and against the end portions 71 of the latter, whereupon the valve 81 is turned to its original position (shown in Fig. 9) which results in the lowering of the arms 66 to the full line position in which these are shown in Fig. 3. The valve 81, of course, can be turned to neutral just before these arms have reached their lowermost position and when the arm ends 71 are about level with the upper faces of timbers 90 so that the pipe 57 can be manually rolled from these arm ends onto said timbers.

A timber, of course, can be placed on the ground so that in their lowermost positions the arm ends 71 will come to rest on this timber whereby the pipe 57 carried on these arm ends may be manually rolled therefrom onto the storage support timbers 90. When this is done there is no necessity for turning the valve 81 to neutral position and as soon as the arm ends 91 come to rest upon the timber disposed therebeneath, the elevator platform 30 will start upwardly towards its position just below the upper ends of the vertical guides 58 where the operator will again halt the elevator, by neutralizing valve 81, in readiness for receiving the next pipe to be rolled onto the platform 30 from the pipe transport truck being unloaded.

The slots 69 in the hubs 67 of the arms 66 allow a slight freedom of swinging of the latter about the hollow shaft 64, which permits the arms 66 to adjust themselves to irregularities in the ground when they are in lowered position as illustrated in Fig. 8.

The rollers 56 on the rests 54 give the opportunity of shifting each pipe endwise while it is resting on the platform 30 so that the ends of the pipe will be even with the ends of the other pipe lengths on the transport truck or ground timbers 90 onto which it is being loaded.

From the foregoing it will be seen that I have provided a highly mobile pipe loading device which may be readily moved from one location to another and set up in a relatively short time in proper juxtaposition between a low level storage of well pipe lengths and the pipe supporting bed of an ordinary pipe transport truck and which is operative with relative safety to the personnel and with a minimum of exertion to transfer pipe from the storage to the truck bed or vice versa.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In a pipe loading device, the combination with a wheeled body having a power unit mounted thereon of a vertically movable platform carried by said body, pivotally united toggle arms carried by said body and engaging said platform, hydraulic means powered by said power unit for pivotally moving said toggle arms to elevate said platform with respect to said body, a rotatable shaft carried by said body adjacent said platform, lifting arms carried by said shaft, hydraulic means powered by said power unit for rotating said shaft to pivotally move said lifting arms, ground engaging means carried by said body to prevent tilting of the body under the influence of lifting strain, standards carried by said body to prevent accidental displacement of pipes from said platform, and rollers carried by said platform and engaging pipe carried thereby to permit longitudinal movement of pipe while supported by said platform.

2. In a mobile pipe loading device, the combination of: a wheeled mobile chassis including a chassis frame which is relatively long and narrow and disposed close to the ground; a relatively long and narrow platform which is substantially coextensive in length with said frame and mounted in superimposed relation thereon; a pair of spaced rests on said platform on which a single length of pipe may be received to support the same superimposed above said platform and parallel with the latter; a pair of arms pivotally mounted on one side of said chassis frame on an axis parallel with the latter; a pair of substantially vertical guides mounted on the opposite side of said frame and extending upwardly therefrom a substantial distance above said platform for holding a length of pipe against rolling in the direction of said guides from said spaced rests; means on said frame for engaging the ground to prevent lateral rocking of said frame during a pipe loading operation; and power means on said chassis to effect the swinging of said arms from a downwardly outwardly inclined position in which said arms are adapted to receive a pipe length rolled onto the ends thereof, to an upward approximately horizontal position in which said pipe is adapted to be readily transferred from said arms onto said rests on said platform by rolling said pipe along said arms, said power means also being operative upon the arrival of a pipe length on said rests to lift said platform to raise said pipe length above the upper ends of said vertical guides whereby said pipe may be rolled from said rests over the upper ends of said guides onto suitable ramp members disposed to receive the same.

3. A combination as in claim 2 in which a control mechanism is provided for said power means whereby the elevation of said platform may be halted beneath the upper ends of said vertical guides so that a length of pipe may be delivered from a pair of ramps onto and over the upper ends of said vertical guides and downwardly onto said pipe rests on said platform, and said platform then lowered to its normal lower position, said pipe rolled from said rests onto said arms with the latter in their substantially horizontal position, and said arms then be lowered with said pipe length resting thereon, to their lower outwardly inclined position in which they deliver said pipe length to a low level storage for the same.

4. A combination as in claim 2 in which the upper edges of said pipe rests are inclined towards said vertical guides to cause a pipe length supported on said rests to roll into constant engagement with said guides while said platform is elevating said pipe length and whereby said pipe length will be caused to roll over the upper ends of said pipe lengths onto receiving ramps or the like positioned to receive the same when said pipe has been lifted by said platform above the upper ends of said vertical guides.

5. A combination as in claim 2 in which said vertical guides are adjustable vertically to predetermine the height at which a pipe length elevated thereby may be discharged laterally by said pipe loading device.

6. A combination as in claim 2 in which said power means includes a power driven pump; a hydraulic cylinder for actuating said arms; a hydraulic cylinder for elevating said platform; and a two-way control valve for controlling the delivery of fluid under pressure from said pump to said cylinders, said valve in its primary operative position delivering fluid to certain corresponding ends of said cylinders and releasing the pressure from the opposite ends of said cylinders, said valve having the reverse action when in its secondary operative position, the effect of said first operative position of said valve lowering said platform and thereafter elevating said arms, said secondary operative position of said valve being effective in lowering said arms and thereafter elevating said platform.

7. In a mobile pipe loading device, the combination of: a wheeled chassis including a chassis frame which is relatively narrow for its length; a vertically reciprocable pipe length elevator mounted on said frame and including a pair of pipe length elevating rests one of which is located near the front end of said frame and the other near the rear end thereof, whereby said rests may support a pipe length longitudinally parallel with and superimposed above said chassis, said elevator being adapted to lift said rests between a lower position and an upper position, a substantially greater distance than the distance said lower position is located above the ground; a pair of arms swingably mounted on said chassis along one side thereof on an axis parallel with said chassis and located substantially at the level of said lower position and with said arms having means at their ends for retaining a pipe length thereon when said arms are swung upwardly from a downwardly inclined position, whereby said pipe length may be rolled from said arms onto said rests; power means for actuating said arms to deliver a pipe length onto said rests and then to actuate said elevator to lift said rests to their upper position; and means causing said pipe length to be discharged laterally from said rests, when said rests have been lifted to said upper position, said discharge being towards the opposite side of said chassis from that on which said arms are mounted.

8. A combination as in claim 7 in which upper edges of said rests are inclined towards the side of said chassis on which said pipe length is discharged, said pipe discharging means including a pair of vertical guides which are mounted on said chassis along the pipe discharge side thereof, said guides being positioned to be engaged by a pipe length delivered onto said rests in their lower position and retain said pipe length on said rests until the latter lifts said pipe length above the upper ends of said guides, whereupon said pipe length will gravitate downwardly along the inclined edges of said rests and over the upper ends of said pipe guides onto whatever means may be provided to receive said pipe length.

9. A combination as in claim 8 in which said vertical pipe guides are provided with means to facilitate their vertical adjustment on said chassis frame whereby the upper ends of said guides may be located at a predetermined height.

10. In a mobile pipe loading device, the combination of: a wheeled chassis including a chassis frame which is relatively narrow for its length; a reciprocable pipe length elevator mounted on said frame and including a pair of pipe length lifting rests one of which is located near the front end of said frame and the other near the rear end thereof, whereby said rests may support a pipe length longitudinally parallel with and superimposed above said chassis, upper edges of said rests being inclined downwardly towards the discharge side of said chassis, said elevator being adapted to lift said rests between a lower position and a substantially higher upper position; a pair of guides mounted on said frame and extending upwardly alongside said elevator to engage a pipe length supported by said rests and prevent said pipe length from rolling downwardly off of said rests; and power means for actuating said elevator to lift said rests to their upper position in which they pass above the upper ends of said guides whereby said pipe length gravitates downwardly along said inclined edges of said rests and over the upper ends of said guides onto whatever means is provided for receiving said pipe lengths.

11. A combination as in claim 10 in which said guides are adjustable to vary the height at which their upper ends are disposed in order to select the level at which pipe lengths are discharged from said rests in their upward travel.

WHETSTINE B. PRIDY.

REFERENCES CITED

The following references are of record in the file of this patent:

UNITED STATES PATENTS

| Number | Name | Date |
|---|---|---|
| 2,023,184 | Watson, Jr. | Dec. 3, 1935 |
| 2,123,505 | Faries | July 12, 1938 |
| 2,194,125 | Rinehart | Mar. 19, 1940 |
| 2,352,726 | Maulding | July 4, 1944 |
| 2,400,803 | Barnhart | May 21, 1946 |
| 2,418,726 | Rogers, Jr. | Apr. 8, 1947 |
| 2,487,305 | Bridegroom | Nov. 8, 1949 |
| 2,487,808 | Holleman, Jr. | Nov. 15, 1949 |